(12) United States Patent
Angele et al.

(10) Patent No.: US 7,269,592 B2
(45) Date of Patent: Sep. 11, 2007

(54) COMPUTER SYSTEM

(76) Inventors: Jürgen Angele, Obere Hauptstrasse 19, Herxheim (DE) D-76863; Alexander Madche, Lorenzstrasse 20b, 76135 Karlsruhe (DE)

( * ) Notice: Subject to any disclaimer, the term of this patent is extended or adjusted under 35 U.S.C. 154(b) by 402 days.

(21) Appl. No.: 10/705,900

(22) Filed: Nov. 13, 2003

(65) Prior Publication Data

US 2004/0098401 A1    May 20, 2004

Related U.S. Application Data

(63) Continuation-in-part of application No. PCT/EP02/05347, filed on May 15, 2002.

(30) Foreign Application Priority Data

May 17, 2001   (DE) ................................ 101 23 959

(51) Int. Cl.
   *G06F 17/00*   (2006.01)
   *G06F 7/00*   (2006.01)
(52) U.S. Cl. ................... 707/100; 707/103 R
(58) Field of Classification Search ............... 707/3–5, 707/10, 100, 101–104.1; 709/201, 203, 217, 709/223; 717/108, 137, 141, 163, 107
   See application file for complete search history.

(56) References Cited

U.S. PATENT DOCUMENTS 5,206,951 A * 4/1993 Khoyi et al. ............... 719/315
5,606,661 A * 2/1997 Wear et al. .................... 714/38
5,930,798 A * 7/1999 Lawler et al. ............. 707/102
5,940,616 A * 8/1999 Wang ......................... 717/127
6,192,371 B1 * 2/2001 Schultz ................... 707/103 R
6,230,159 B1 * 5/2001 Golde .................... 707/103 R
6,356,946 B1 * 3/2002 Clegg et al. ................ 709/231
6,385,769 B1 * 5/2002 Lewallen .................... 717/125
6,550,053 B1 * 4/2003 Muckley .................... 717/100
6,728,692 B1 * 4/2004 Martinka et al. ............ 706/45
2005/0034107 A1 * 2/2005 Kendall et al. ............. 717/136

FOREIGN PATENT DOCUMENTS

DE   198 16 658 A1   10/1998

OTHER PUBLICATIONS

Staab S et al., "Semantic community Web portals," Computer Networks, Elsevier Science Publishers B.V., Amsterdam, NL, Jun. 2000, vol. 33, No. 1-6.

Fensel D et al., "OIL: an ontology infrastructure for the Semantic Web," IEEE Computer Society, Los Alamitos, CA, US, Mar. 2001, pp. 38-45.

(Continued)

*Primary Examiner*—Jeffrey Gaffin
*Assistant Examiner*—Jacques Veillard

(57) ABSTRACT

A method of storing and retrieving data in a computer system comprises steps of forming at least one object model, the object model including at least one class structure; allocating data according to one or more classes of said at least one class structure; providing a set of rules, the rules forming a declarative system and linking components of class structures; providing a query command; and in response to the query command, processing a series of said rules to obtain one or more output variables.

51 Claims, 3 Drawing Sheets

OTHER PUBLICATIONS

Fensel D et al., "Lesson Learned from Applying AI to the Web," International Journal of Cooperative Information System, World Scientific Publishing Co., Singapore, Dec. 2000, pp. 361-382, vol. 9, No. 4.

Decker S et al., "Ontobroker: ontology based access to distributed and semi-structured information," Database Application Semantics. Proceedings of the IFIP WG 2.6 Working Conference on Database Applications Semantics, Jan. 4, 1999, pp. 351-369.

Kifer M et al., "F-logic: a higher-order language for reasoning about objects, inheritance, and scheme," ACM Proceedings of Sigmod International Conference on Management of Data, May 31, 1989, pp. 134-146, vol. 18, No. 2.

Mattos N M et al., "Grand tour of concepts for object-orientation from a database point of view," Data & Knowledge Engineering, Amsterdam, NL, 1992, p. 321-352, vol. 9, No. 3.

* cited by examiner

COMPUTER SYSTEM

CROSS-REFERENCE TO RELATED APPLICATION

This application is a continuation-in-part of PCT International Application No. PCT/EP02/05347, filed May 15, 2002, incorporated herein by reference, which claims the priority of German Patent Application No. 101 23 959.9, filed on May 17, 2001.

FIELD OF THE INVENTION

The present invention addresses computer systems and methods for the efficient storage and recovery of information.

DESCRIPTION OF RELATED ART

Computer systems of the type with which the present invention is concerted are often formed with computer units connected into a network and provided with means for storing data, in particular integrated database systems. In particular, the computer units can also be connected to the Internet, so that the database systems can be queried via the Internet.

Database systems of this type generally contain large data records that can be queried with specified query commands. One critical problem, particularly with databases storing large amounts of data, is the definition of suitable query commands to obtain the desired search results.

Searches of this type are particularly difficult if information on general subjects is needed, but very little searchable data on these subjects is available.

As an example, suppose that a computer system comprises database systems in which different types of technical, medical and business publications are stored. A user of this database system knows the name of an author of a publication, but only knows that the publication is a technical publication. The only search term available to the user is the name of the author of this publication. This name functions as input variable for the search, which is input via a query unit into the computer system. The user must search through all query results for the researched name to reach the desired publication, if necessary by using additionally available information on the author, because no further information is available. An additional manual evaluation of this type is extremely involved and is also the cause of many error sources, so that the search result is subject to considerable inaccuracies.

SUMMARY OF THE INVENTION

It is an object of the present invention to create a computer system of the aforementioned type and an associated method to ensure the most comprehensive, simple and flexible access to information stored in the computer system.

According to one embodiment, the invention comprises a computer system that includes means for storing data; means for allocating the data to classes of at least one class structure forming an object model; an inference unit for generating output variables by evaluating rules; means for the input of a query command for instructing said inference unit to generating output variables by evaluating rules, the rules forming a declarative system and linking components of class structures; and an editor for generating at least one of rules, class structures, and components thereof.

According to a further embodiment, the invention comprises a method of storing and retrieving data in a computer system. The method may comprise the steps of forming at least one object model, the object model including at least one class structure; allocating data according to one or more classes of said at least one class structure; providing a set of rules, the rules forming a declarative system and linking components of class structures; providing a query command; and in response to the query command, processing a series of said rules to obtain one or more output variables.

The invention may further be embodied in the form of a computer-readable medium containing software code embodying the above method. Examples of such computer-readable media include RAM, ROM, PROM, bubble memory, magnetic media, the various types of disks, paper tape, punch cards, etc.

The invention may also be embodied in the form of a computer system executing the above method or comprising a processor and the above computer-readable medium. It may further be embodied in the form of a data signal carrying software embodying the method.

The basic idea behind the invention, therefore, is that the data stored in the computer system are structured within at least one object model, preferably within several object models. Object models of this type, which form ontologies, represent class structures having classes that are structured hierarchically or in acyclical graphs, wherein several attributes that are passed on within a class structure are preferably allocated to the classes. According to the invention, information stored in the computer system can not, or not solely, be accessed by querying data stored therein. Instead, the computer system according to the invention comprises a predetermined number of rules that are allocated to at least one inference unit.

Attributes of at least one class structure and/or classes of at least one class structure and, if necessary, also stored data can be linked with these rules. The rules here represent the logical linking rules, which relate the individual aforementioned elements in a pre-defined manner to each other. An evaluation is made in the inference unit where concrete values for the attributes, classes and/or data are allocated to these rules, thus generating specific output variables.

With the editor according to the invention, the computer system user him- or herself can generate the rules and/or class structures. For this, the editor is provided with corresponding programming surfaces or graphic surfaces by means of which the respective components of the rules and/or class structures can be input. Thus, the rule structures as well as the class structures can be input and changed easily and flexibly with the editor.

In particular, graphic surfaces can be provided for generating the rules, and which make it possible to define the rules completely. Alternatively, rules can be programmed freely in the editor, meaning the user specifies all the rules through the input of programming commands. According to another advantageous embodiment of the invention, axioms that are specified in the editor can be selected. If the user selects an axiom, a rule that is clearly allocated to this axiom and is preferably stored in the editor is activated, thus making it particularly easy for the user to generate the desired rules.

One essential advantage of the computer system according to the invention is that the query and evaluation of information is not limited to the level of the data stored in the computer system. Rather, the queries are expanded to include the structural elements of the object models for structuring the data. Thus, even complex facts and connections can be extracted from the information stored in the computer system even with rudimentary and simple queries. and/or input values.

A simple example for the computer system according to the invention is a computer unit with an integrated database system. By querying specific classes or attributes, data subsets are obtained as output variables without having to query the data itself directly. Query schemes of this type are particularly advantageous because they make it possible to classify data according to easily searched specific criteria and characteristics by using the classes and attributes of class structures. These sub-classes can then be divided further into additional subordinate classes, to which various attributes are allocated.

The data allocated to these elements can then be determined by querying specific classes and attributes with the computer system according to the invention, without entering a concrete query for concrete data. A particularly powerful and flexible query system that considerably expands the search options as compared to traditional database systems is thus created with the option of querying the class and/or attribute level above the data level.

Furthermore, relationships can be established between data, attributes and/or classes not stored in this form in the database system by evaluating the rules. Thus, new knowledge can be derived from known, stored variables by using the computer system according to the invention.

Another advantage of the computer system according to the invention is that a user can input several query terms as input variables into the computer system without having to make a distinction whether these query terms are data, classes or attributes to be searched. In the form of input variables that are entered into the inference unit, these query terms are linked to the respective rules allocated to a query command. The query terms are then allocated, with the aid of the rules, to the data, classes and/or attributes of an object model. Data subsets are obtained as output variables, which have a predetermined relationship to each other, corresponding to the setup of the rules. In the simplest case, the query terms are linked to form a single output variable.

BRIEF DESCRIPTION OF THE DRAWINGS

The invention is explained in the following with the aid of the attached drawings, in which.

DETAILED DESCRIPTION OF THE INVENTION

Figure 1:
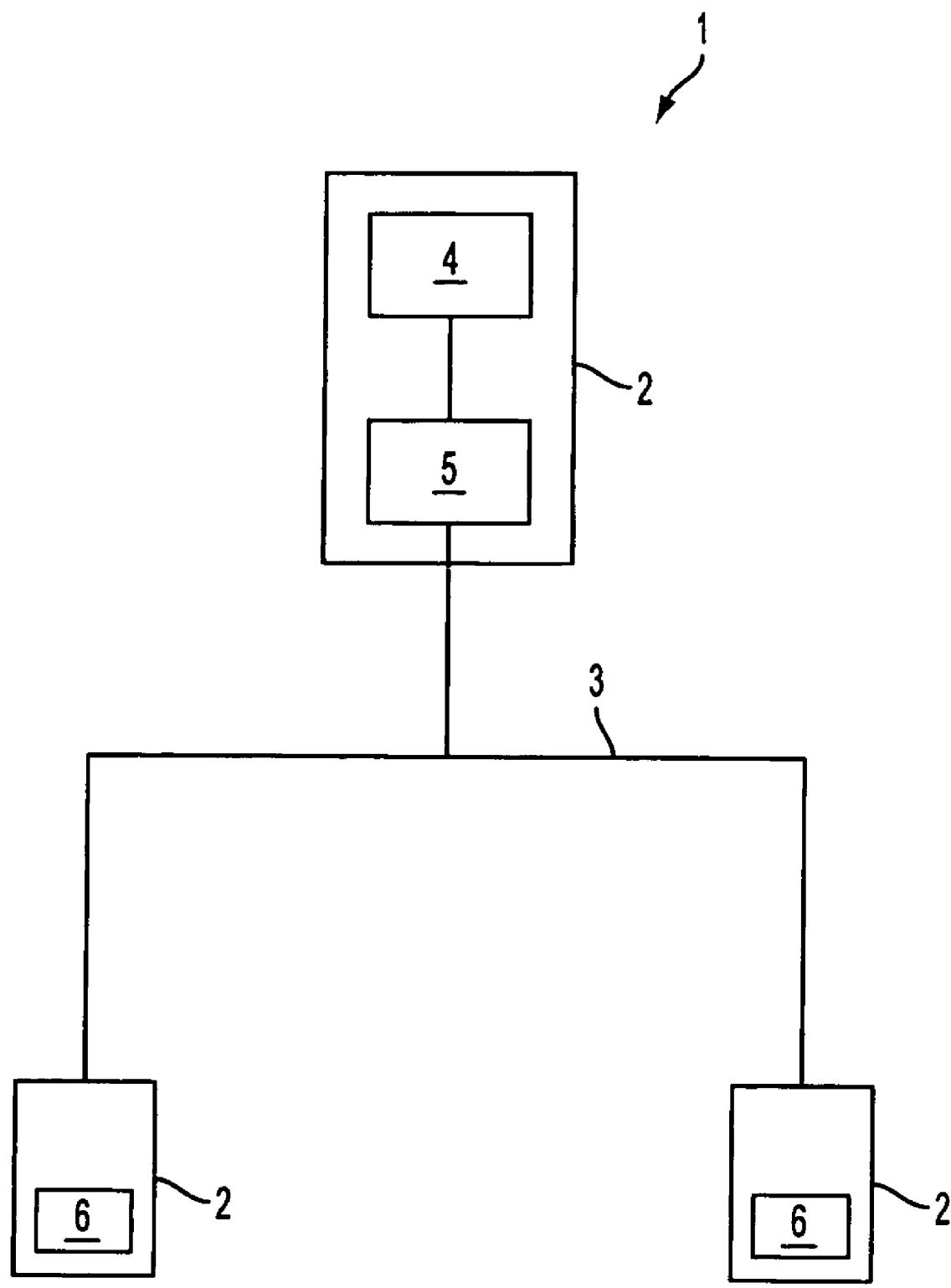
FIG. 1 shows a configuration of an exemplary embodiment of the computer system according to the invention.

FIG. 1 contains a schematic diagram of the basic design of a first exemplary embodiment of the inventive computer system 1. The computer system 1 comprises several computer units 2 that are connected via computer lines 3 to form a network. One of the computer units 2 functions as a central computer on which data are stored. A database system 4 forms the means for storing the data. An inference unit 5 is provided for carrying out and evaluating queries in the database system 4. In addition, the computer unit 2 comprises a terminal 6 as input/output unit, which can be used to operate an editor.

Several users can access the database system 4 via additional computer units 2 that are connected to the network. These computer units 2 may be, for example, personal computers. The computer units 2 are provided with suitable input/output units for this, which preferably take the form of terminals 6.

The Internet in particular may function as the network, in which case the computer units 2 are provided with corresponding Internet hookups.

Object models, so-called ontologies, are used for structuring the data stored in the database system 4. An object model has a class structure, wherein the structure may be a hierarchical structure. With hierarchical structures, the classes of a predetermined level are respectively allocated to precisely one class of a superior level, meaning only single inheritances are permitted. In general, the class structure can also be embodied as an acyclic graph for which multiple inheritances are permitted.

Figure 2:
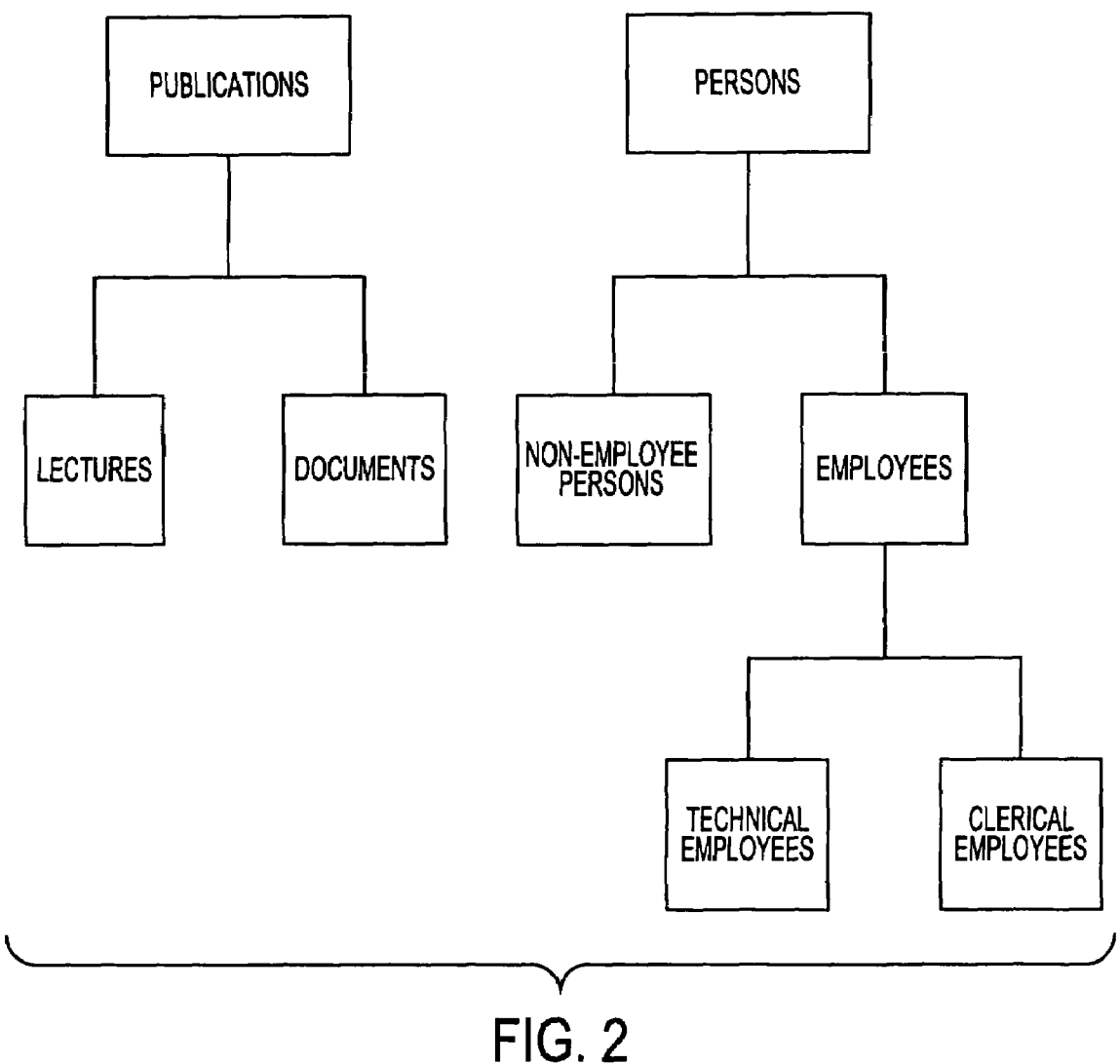
FIG. 2 shows object models for structuring the data stored on a computer system according to FIG. 1.

FIG. 2 shows examples of two such hierarchical class structures that respectively form one object model. The first object model contains a "publications" class to which the subordinate classes "lectures" and "documents" are allocated. The second object model contains a "persons" class to which the subordinate classes "non-employees" and "employees" are allocated, in which the additional subordinate classes "technical employees" and "clerical employees" are allocated to the sub-class "employees."

Specific attributes are allocated to the classes of respectively one hierarchical class structure. In the process, an attribute allocated to a class, for example, the "persons" class, is passed onto the subordinate classes for this class, wherein, for example, an attribute of this type can be a name. For the present example, this attribute is passed on within the class structure to the subordinate classes "non-employees" and "employees," as well as to the subordinate classes for this latter class, meaning "clerical employees" and "technical employees." In this way, a particularly efficient structuring of the data in the database system 4 is consequently created.

Rules are allocated to the inference unit 5 for processing the queries in the database system 4. These rules are stored in the inference unit 5 itself or in a memory unit that is allocated to the inference unit 5 (and not explicitly shown in FIG. 1).

The object models as well as the language for formulating these rules can differ. The object models are preferably of the type DAML+OIL (where DAML stands for "DARPA Agent Markup Language, a language/tools for facilitating the concept of the semantic web), wherein DAML-L is used as the rule language.

To process queries in the database system 4, defined query commands are entered into an input/output unit 6. Depending on the format for the query command, a series of rules is processed in the inference unit 5. Since the rules in general are a declarative system, the sequence for the definition of the rules is not important.

The rules involve relationships in the form of logic links between classes and/or attributes and/or data of the database system 4. The rules allocated to a query command for generating defined output variables are evaluated in the inference unit 5. It is useful if the output variables are subsequently output via the input/output unit.

By linking attributes and classes via a predetermined number of rules, it is easy to query data subsets in the database system 4, without having to refer to specific data in the query commands.

As compared to traditional database systems 4, where the query commands are limited to the data level, the option of processing a query on the class and attribute level allows for a considerable expansion and higher flexibility of the processing options.

For example, a query command of this type can have the following format:

"Output of the names for all data stored in the hierarchy of the class structure for the object model "persons" below the "employees" level.

The names of all technical and clerical employees stored in the database system 4 are then displayed for the user as output variables.

According to another advantageous embodiment, relationships between different attributes, classes and/or data can be created with the rules allocated to the individual query commands. In particular, attributes, classes and/or data from the various class structures can also be linked with these rules.

A particular advantage is that the user only needs to input the terms for processing the search, preferably in sequence, when entering the query command. The user is not required to define whether these terms relate to classes, attributes or data. In addition, the user is not required to intervene in the structure of the rules that are allocated to a specific query command. The inference unit 5 automatically allocates the terms to the rules and processes the rules.

One example of a query of this type can be structured as follows. A user would like to inquire about the level of knowledge of a person, known to the user, with the name "Mustermann."

The user thus enters the two search variables "Mustermann" and "knowledge" into the input/output unit.

The rules allocated to this query command are evaluated in the inference unit 5, wherein a rule of this type can be worded as follows:

"If a person writes a document and the document deals with a subject, then this person has knowledge of the subject."

The classes "persons" and "document" from two different class structures are linked with this rule. Reference is made in the process to the subject of documents, wherein the subjects of documents, for example, are allocated as data to the "document" class.

Whether or not a person has "knowledge" of this subject is obtained as an output variable for this rule.

The example shows that the query not only obtains information stored in the database system 4 as a result of such links. Rather, rules of this type establish relationships between elements in the database systems 4, such that new characteristic variables can be derived if necessary. It means that with the rules from the data stored in the database system 4, new knowledge can be derived, which is not stored in this form in the database system 4.

In the inference unit 5, the above-mentioned rule is evaluated in dependence on the input variables "knowledge" and "Mustermann" with the aid of an allocation diagram stored therein, which reads as follows for the present case:

Mustermann is a person.
Mustermann is the author of a dissertation.
The subject matter of this dissertation is biotechnology.
The dissertation is a document.

Using the aforementioned rule for evaluating these allocations results in showing that "Mustermann" has knowledge of biotechnology. The result is preferably output via the input/output unit.

One essential difference between this system and known database systems 4 is that the search result "Mustermann has knowledge of biotechnology" was not obtained either through a query of the database with the term "knowledge" nor with the term "biotechnology."

Processing a query with the term "biotechnology" in a traditional database system 4 would require that the user already has detailed information concerning the knowledge of Mustermann. Furthermore, the term "biotechnology" would have to be enqueued explicitly in a data record allocated to the person Mustermann.

A query with the term "knowledge" in principle would not make sense in a traditional database system 4 since the abstract term "knowledge" cannot be allocated to a concrete fact "biotechnology."

In contrast, the computer system 1 according to the invention links abstract terms such as classes and/or attributes with the aid of rules, which provide new characteristic variables as output variables, as for the case at hand. These, in turn, can form abstract variables that can be researched directly by the user. The inference unit 5 then automatically allocates concrete values directly to the abstract variables of the set of rules.

The example shows that, compared to traditional database systems 4, considerably less pre-knowledge, and thus also less data input, is required for the computer system 1 according to the invention to arrive at precise search results.

The object models, as well as the rules allocated to the inference unit 5, can be specified via the editor, at least in part, wherein the user can operate the editor via the terminal 6 that is allocated to the central computer.

The editor has programming surfaces and/or graphic surfaces, which the user can use to generate rules and/or class structures either in components or completely.

The configuration of a class structure, for example, can be generated graphically, and the class structure is then created with the aid of graphic elements. FIG. 2 shows one example for a graphic representation of class structures of this type.

Alternatively, the class structure can be created by programming in the respective components.

For the object models according to FIG. 2, for example, it means that corresponding hierarchically divided directories are set up in the editor for the individual classes.

A directory structure that corresponds to the class structures according to FIG. 2 is shown in the following table:

TABLE 1 persons
non-employees
employees
clerical employees
technical employees
publications
lectures
documents For this, the main directory corresponding to the "persons" class is divided into sub-directories for "non-employees" and "employees." In accordance with the allocation of the subordinate classes "clerical employees" and "technical employees" to the superior class "employees," two corresponding sub-directories are allocated to the "employees" directory in Table 1.

Attributes can subsequently be allocated to the classes of a class structure generated in this way.

The programming surface in this case may be designed, for example, such that when clicking on a class of a class structure, a window is opened up into which the individual attributes are entered as variables. For example, if the user clicks on the "person" class by clicking on the corresponding directory, attributes such as first name, last name, birth date and the like can be input into the corresponding window. In addition, value ranges are allocated to the individual attributes.

The user can specify complete class structures in this way, to which the individual data are subsequently allocated, wherein the data can be input via the editor. Central input/output units can furthermore be provided for the data input.

The user can furthermore generate rules with the aid of the editor, which are evaluated in the inference unit 5 for generating the output variables.

A first option for generating the rules requires the user to freely program the rules, where the rules are in the DAML-L programming language. The user in this case must be proficient in this programming language.

The rules can be generated more easily if a predetermined number of axioms is defined in the editor, in which the axioms are displayed for the user in a window on the programming surface of the editor. A defined rule type is allocated in this case to each axiom.

The user selects a specific axiom by clicking on the programming surface, which generates a rule of the corresponding rule type.

The axioms preferably are formed with defined mathematical terms.

Binary relationships such as symmetrical, anti-symmetrical, asymmetrical, inverse, reflexive, non-reflexive or transitive relationships are examples of mathematically defined axioms of this type. Axioms can also express the disjunctive nature of classes.

Finally, the user can also generate the rules graphically. A suitable graphic surface for this is shown in FIG. 3.

Figure 3:
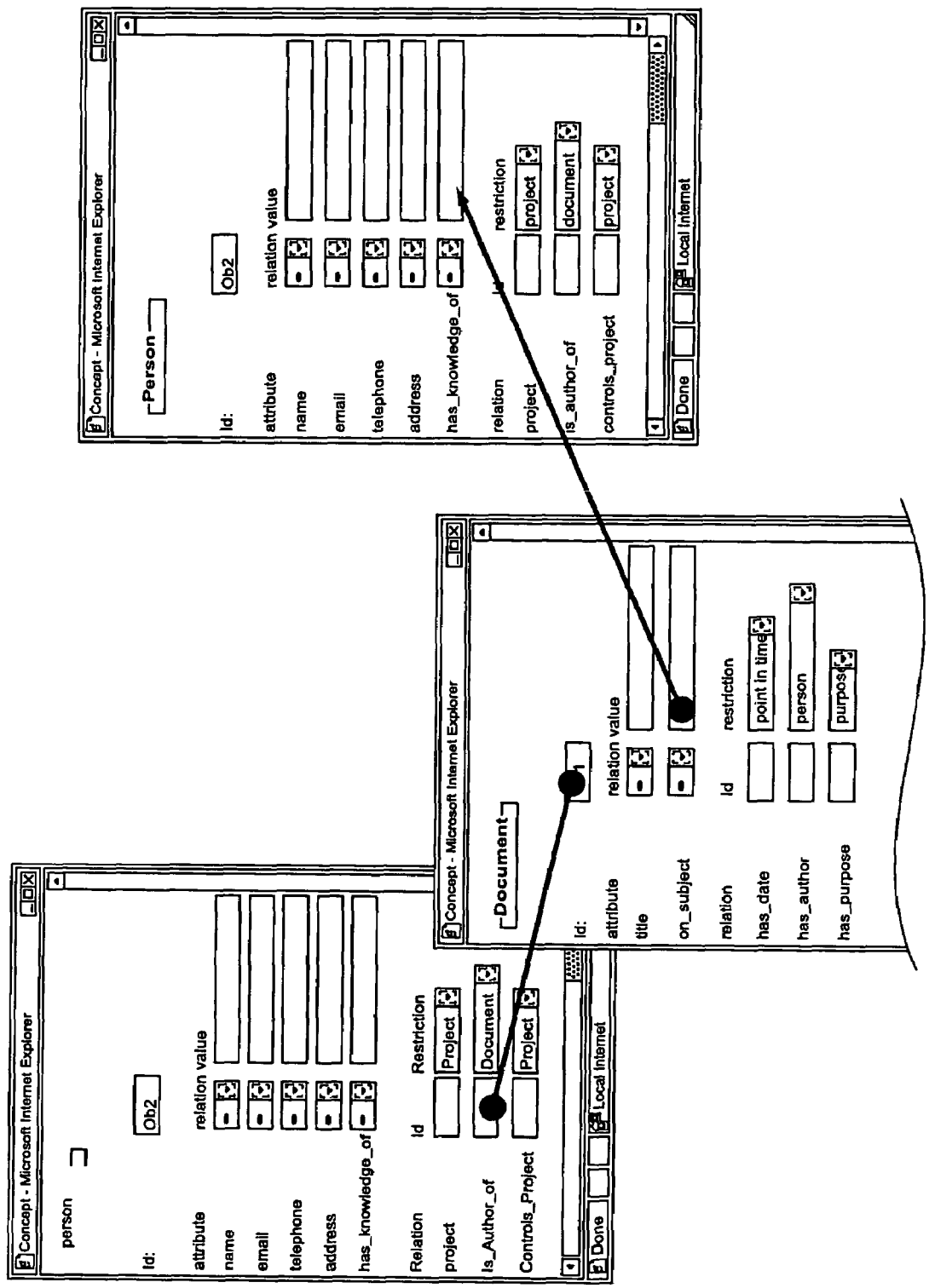
FIG. 3 shows an exemplary embodiment of a graphic surface for the editor for the computer system according to FIG. 1.

FIG. 3 shows a state of the graphic surface where three different windows are opened, wherein each window contains a specific class.

Two of the windows are identical and relate to the "person" class. A third window relates to the "document" class, wherein the classes are components of the class structure shown in FIG. 2.

According to the example shown in FIG. 3, personal data such as name, e-mail address, telephone number and address are allocated as attributes to the "person" class. Furthermore, the relationship "knows of" or the equivalent "has knowledge of" is allocated as attribute to the "person on" class.

The following relationships (connections) are further allocated to the "person" class:
project
is the author of
directs the project Characteristic variables of documents, such as title and subject of a document, are allocated to the "document" class as attributes. The following relationships are furthermore allocated to the "document" class:
has date
has author
has a purpose Several components of the classes shown in FIG. 3 are connected with lines in order to graphically generate a rule, as shown in FIG. 3. For the present example, a first line connects the relationship "is author of" in the "person on" class to the "document" class. A second line connects the attribute "on the subject" in the "document" class to the attribute "has knowledge of" in the "person" class.

The graphic elements for generating the rule are designed such that circular surfaces are provided at the end points of the first line and on one end point of the second line. These circular surfaces point to attributes, classes or relationships which define the requirements of a rule. An arrow is located at the second end point of the second line. The attribute "has knowledge of" in the "person" class, to which the arrow points, forms the conclusion of the rule.

Thus, the following rule is generated by specifying the two graphic elements according to FIG. 3, namely two lines delimited by circular surfaces and/or an arrow.

"If a person is the author of a document on a subject, then the person has knowledge of this subject."

A check is finally made via the editor to determine whether the components of class structures and/or rules that are input by the user are correct. In particular, a check is made for consistency and completeness. In case of an incorrect user input, it is advantageous if an error message is generated in the editor.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A computer system comprising:
means for storing data;
means for allocating the data to classes of at least one class structure forming an object model;
an inference unit for generating output variables by evaluating rules; and
means for inputting a query command for instructing said inference unit to generating output variables by evaluating rules, the rules forming a declarative system and linking components of class structures.

2. The computer system according to claim 1, wherein the components are formed by at least one of class structures of individual classes and attributes that are allocated to classes and are passed on within a class structure.

3. The computer system according to claim 1, wherein only single inheritances are permitted in a class structure.

4. The computer system according to claim 1, wherein multiple inheritances are permitted within a class structure.

5. The computer system according to claim 1, wherein at least one of classes, attributes and data of at least one class structure are linked with said rules.

6. The computer system according to claim 1, wherein the object model or any object model forming a class structure is configured as DAML+OIL model.

7. The computer system according to claim 6, wherein the rules are formulated with the rule language DAML-L.

8. The computer system according to claim 1, wherein relations between classes and/or attributes and/or data of at least one class structure are formed in the inference unit.

9. The computer system according to claim 1, wherein the output variables are formed by at least one of the classes, attributes and data of at least one class structure.

10. The computer system according to claim 1, wherein the output variables are formed with new relations between data and/or classes and/or attributes of at least one class structure.

11. The computer system according to claim 1, further comprising:
an editor for generating at least one of rules, class structures, and components thereof.

12. The computer system according to claim 11, further comprising a terminal allocated to said editor, wherein the classes of a class structure are input using said editor at said terminal.

13. The computer system according to claim 12, wherein attributes of classes are input using said editor at said terminal.

14. The computer system according to claim 13, wherein predetermined value ranges are allocated with the editor to at least one of the attributes and the classes.

15. The computer system according to claim 11, wherein rules are programmed with the aid of the editor.

16. The computer system according to claim 11, further comprising means for storing said rules, the means for storing associated with said inference unit.

17. The computer system according to claim 16, wherein a number of rules are stored in said means for storing said rules, and wherein the editor is adapted to enable the selection of a predetermined number of rules.

18. The computer system according to claim 17, wherein a predetermined number of axioms are defined in the editor, wherein a specific rule type is allocated to each axiom, and wherein a rule of the specific rule type is generated by selecting an axiom in the editor.

19. The computer system according to claim 18, wherein the axioms are mathematical terms that define the functions of the rules.

20. The computer system according to claim 11, wherein the editor comprises a graphic surface.

21. The computer system according to claim 20, wherein rules are generated using the graphic surface.

22. The computer system according to claim 21, wherein at least one of classes, attributes, and data, as well as relations among these, are visualized as graphic components in the editor, and wherein rules are defined by linking graphic components.

23. The computer system according to claim 22, wherein data are input using the editor.

24. The computer system according to claim 11, wherein the rules and class structures are checked with the aid of the editor.

25. The computer system according to claim 24, wherein an error message is generated in the editor if faulty rules or class structures are generated.

26. The computer system according to claim 1, further comprising at least one input/output unit.

27. The computer system according to claim 26, wherein a query command for activating the inference unit is input via the input/output unit.

28. The computer system according to claim 26, wherein the system performs at least one of inputting data and outputting output variables via the input/output unit.

29. A method of storing and retrieving data in a computer system, the method comprising the steps of:
forming at least one object model, the object model including at least one class structure;
allocating data according to one or more classes of said at least one class structure;
providing a set of rules, the rules forming a declarative system and linking components of 6 class structures;
providing a query command; and
in response to the query command, processing a series of said rules to obtain one or more output variables.

30. The method according to claim 29, wherein the step of providing a set of rules includes the step of:
permitting a user to at least one of create and edit rules.

31. The method according to claim 30, wherein the step of permitting a user at least one of create and edit rules includes the step of:
generating an error message if a faulty rule is detected.

32. The method according to claim 30, wherein the step of permitting a user to at least one of create and edit rules includes the steps of:
defining a predetermined number of axioms, a specific type of rule being allocated to each axiom; and
permitting a user to create a rule of a specific type by selecting an associated axiom.

33. The method according to claim 32, wherein each axiom comprises mathematical terms that define functions of rules.

34. The method according to claim 29, further comprising the step of:
permitting a user to at least one of create and edit at least one class structure.

35. The method according to claim 34, wherein the step of permitting a user at least one of create and edit at least one class structure includes the step of:
generating an error message if a faulty class structure is detected.

36. The method according to claim 29, wherein components of class structures are formed by at least one of class structures of individual classes and attributes that are allocated to classes and passed on within a class structure.

37. The method according to claim 29, wherein the rules link at least one of classes, attributes, and data of the at least one class structure.

38. The method according to claim 29, further comprising the step of:
forming relations between at least one of classes, attributes, and data of at least one class structure to create new rules.

39. The method according to claim 29, wherein the one or more output variables comprise at least one of classes, attributes, and data of at least one class structure.

40. The method according to claim 29, wherein the step of processing a series of said rules to obtain one or more output variables includes the step of:
forming new relations between at least one of data, classes, and attributes of at least one class structure.

41. The method according to claim 29, further comprising the step of:
inputting attributes of classes.

42. The method according to claim 29, further comprising the step of:
allocating predetermined ranges of values for at least one of attributes and classes.

43. The method according to claim 29, further comprising the step of:
permitting a user to select rules using an editor.

44. The method according to claim 29, further comprising the step of:
providing a graphic surface permitting the visualization of at least one of classes, attributes, and data and relations therebetween, the graphic surface further permitting rules to be defined by linking graphic components.

45. The method according to claim 29, wherein the step of providing a query command includes the step of:
permitting a user to enter a query command using input/output means.

46. A computer system to execute a method of storing and retrieving data in a computer system, the method comprising the steps of:
- forming at least one object model, the object model including at least one class structure;
- allocating data according to one or more classes of said at least one class structure;
- providing a set of rules, the rules forming a declarative system and linking components of class structures;
- providing a query command; and
- in response to the query command, processing a series of said rules to obtain one or more output variables.

47. A computer-readable storage medium containing software code that, when executed by a processor, causes the processor to implement a method comprising:
- forming at least one object model, the object model including at least one class structure;
- allocating data according to one or more classes of said at least one class structure;
- providing a set of rules, the rules forming a declarative system and linking components of class structures;
- providing a query command; and
- in response to the query command, processing a series of said rules to obtain one or more output variables.

48. The computer-readable storage medium according to claim 47, further containing software code that when executed by the processor causes the processor to also implement:
- permitting a user to at least one of create and edit rules.

49. The computer-readable storage medium according to claim 48, further containing software code that when executed by the processor causes the processor to also implement:
- defining a predetermined number of axioms, a specific type of rule being allocated to each axiom; and
- permitting a user to create a rule of a specific type by selecting an associated axiom.

50. The computer-readable storage medium according to claim 47, further containing software code that when executed by the processor causes the processor to also implement:
- permitting a user to at least one of create and edit at least one class structure.

51. A computer system comprising:
- at least one processor; and
- at least one computer-readable storage medium containing software code that, when executed by at least one said processor, causes the processor to implement a method comprising:
- forming at least one object model, the object model including at least one class structure;
- allocating data according to one or more classes of said at least one class structure;
- providing a set of rules, the rules forming a declarative system and linking components of class structures;
- providing a query command; and
- in response to the query command, processing a series of said rules to obtain one or more output variables.

* * * * *